United States Patent [19]
Lee

[11] Patent Number: 6,115,765
[45] Date of Patent: Sep. 5, 2000

[54] METHOD OF SWAPPING AUXILIARY STORAGE DEVICES USING A SUSPEND MODE

[75] Inventor: Kil-Moo Lee, Seoul, Rep. of Korea

[73] Assignee: SamSung Electronics Co., Ltd., Suwon, Rep. of Korea

[21] Appl. No.: 09/198,402

[22] Filed: Nov. 24, 1998

[30] Foreign Application Priority Data

Nov. 24, 1997 [KR] Rep. of Korea ............... 97-62325

[51] Int. Cl.[7] ............................ G06F 13/00; G06F 12/00; G06F 1/24
[52] U.S. Cl. ......................... 710/103; 710/101; 710/102
[58] Field of Search ................ 710/103, 102, 710/101, 104, 3; 713/323; 711/112; 709/300; 712/214

[56] References Cited

U.S. PATENT DOCUMENTS

| | | |
|---|---|---|
| 4,999,787 | 3/1991 | McNally et al. . |
| 5,526,493 | 6/1996 | Shu . |
| 5,555,510 | 9/1996 | Verseput et al. . |
| 5,579,491 | 11/1996 | Jeffries et al. . |
| 5,598,539 | 1/1997 | Gephardt et al. . |
| 5,632,020 | 5/1997 | Gephardt et al. . |
| 5,664,119 | 9/1997 | Jeffries et al. . |
| 5,671,368 | 9/1997 | Chan et al. . |
| 5,758,103 | 5/1998 | Oh . |
| 5,781,798 | 7/1998 | Beatty et al. . |
| 5,793,987 | 8/1998 | Quackenbush et al. . |
| 5,805,834 | 9/1998 | MacKinley et al. . |
| 5,822,547 | 10/1998 | Boesch et al. . |

*Primary Examiner*—Gopal C. Ray
*Attorney, Agent, or Firm*—Robert E. Bushnell, Esq.

[57] ABSTRACT

A method of swapping auxiliary storage devices in a computer using a suspend mode includes the steps of: determining if a suspend mode command has been given, and, if so, determining if a specific device is mounted a bay of the computer; and setting an event flag if a specific device is mounted in the bay of the computer, and after storing an ID of the specific device, executing the suspend mode, or storing a default value if a specific device has not been mounted in the bay of the computer and executing the suspend mode. The suspend mode enables the swapping of auxiliary storage devices in the bay of the computer while maintaining the computer in an ON state and temporarily suspending all programs in use.

3 Claims, 5 Drawing Sheets

METHOD OF SWAPPING AUXILIARY STORAGE DEVICES USING A SUSPEND MODE

CLAIM OF PRIORITY

This application makes reference to, incorporates the same herein, and claims all benefits accruing under 35 U.S.C. § 119 from an application for METHOD OF SWAPPING AUXILIARY STORAGE DEVICES USING A SUSPEND MODE earlier filed in the Korean Industrial Property Office on the 24$^{th}$ of November 1997 and there duly assigned Serial No. 62325/1997.

BACKGROUND OF THE INVENTION

1. Field of the Invention

The present invention relates to a method of swapping auxiliary storage devices using a suspend mode, and more particularly to a method of conducting a warm swap of auxiliary storage devices such as a HDD, CDD and FDD using a suspend mode and a resume mode so that the swapping of auxiliary storage devices can be conducted without turning the main power of a computer off.

2. Description of the Related Art

In an earlier method of enabling the swapping of auxiliary storage devices in a computer, all programs must be exited and the computer turned off to swap auxiliary storage devices such as HDDs, CDDs and FDDs. The power of the computer is first turned OFF. Subsequently, swapping of the auxiliary storage devices in an auxiliary storage bay of the computer is mechanically performed by the user, after which the power of the computer is turned back on. By the application of power to the computer, the same is rebooted such that a CPU of the computer recognizes the change in the auxiliary storage device.

However, such a method of swapping auxiliary storage devices is time consuming and troublesome. Further, all programs in use must be ended before the computer is turned off, additionally, increasing the amount of time required for this process and causing an extra nuisance to the user.

The following patents each disclose features in common with the present invention but do not teach or suggest the specifically recited method of swapping auxiliary storage devices using a suspend mode in accordance with the present invention: U.S. Pat. No. 5,671,368 to Chan et al., entitled PC Card Controller Circuit To Detect Exchange Of PC Cards While In Suspend Mode, U.S. Pat. No. 5,526,493 to Shu, entitled Docking Detection And Suspend Circuit For Portable Computer/Expansion Chassis Docking System, U.S. Pat. No. 5,664,119 to Jeffries et al., entitled Local Proactive Hot Swap Request/Acknowledge System, U.S. Pat. No. 5,793,987 to Quackenbush et al., entitled Hot Plug Port Adapter With Separate PCI Local Bus And Auxiliary Bus, U.S. Pat. No. 5,579,491 to Jeffries et al., entitled Local Proactive Hot Swap Request/Acknowledge System, U.S. Pat. No. 5,805,834 to McKinley et al., entitled Hot Reconfigurable Parallel Bus Bridging Circuit, U.S. Pat. No. 5,822,547 to Boesch et al, entitled Method And Apparatus For Providing A Portable Computer With Hot Pluggable Modular Bays, U.S. Pat. No. 5,758,103 to Oh, entitled Circuit For Replacing A Peripheral Device Of A Computer System And Method Therefor, U.S. Pat. No. 5,781,798 to Beatty et al, entitled Method And Apparatus For Providing Hot Swapping Capability In A Computer System With Static Peripheral Driver Software, U.S. Pat. No. 5,555,510 to Verseput et al., entitled Automatic Computer Card Insertion And Removal Algorithm, U.S. Pat. No. 4,999,787 to McNally et al., entitled Hot Extraction And Insertion Of Logic Boards In An On-Line Communication System, U.S. Pat. No. 5,598,539 to Gephardt et al., entitled Apparatus And Method For Achieving Hot Docking Capabilities For A Dockable Computer System, and U.S. Pat. No. 5,632,020 to Gephardt et al., entitled System For Docking A Portable Computer To A Host Computer Without Suspending Processor Operation By A Docking Agent Driving The Bus Inactive During Docking.

SUMMARY OF THE INVENTION

The present invention has been made in an effort to solve the above problems.

It is an object of the present invention to provide a method of performing a warm swap of auxiliary storage devices using a suspend mode and a resume mode such that the computer need not be turned off for the swapping of auxiliary storage devices, nor do the programs in use need to be exited.

To achieve the above object, the present invention provides a method of swapping auxiliary storage devices using a suspend mode. The method includes the steps of: determining if a suspend mode command was given, and, if so, determining if a specific device is mounted in a bay of a computer and setting an event flag if a specific device is mounted in the bay of the computer, and after storing an ID of the specific device, executing the suspend mode, or storing a default value if a specific device is not mounted in the bay of the computer and executing the suspend mode.

In the method noted above, the suspend mode enables the swapping of auxiliary storage devices in the bay of the computer while maintaining the same in an ON state and temporarily suspending all programs in use.

According to a feature of the present invention, the method further includes the steps of: determining if a resume mode command was given, and, if so, determining if the device in the bay of the computer was swapped; setting an event flag for a plug-and-play function if the device in the computer was swapped, and executing the resume mode, or directly executing the resume mode if the device in the computer was not swapped; and determining if the event flag was set, and, if so, changing an environment of an operating system and continuing the resume mode, or if the event flag was not set, directly continuing the resume mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will now be described in detail with reference to the accompanying drawings.

Figure 1:
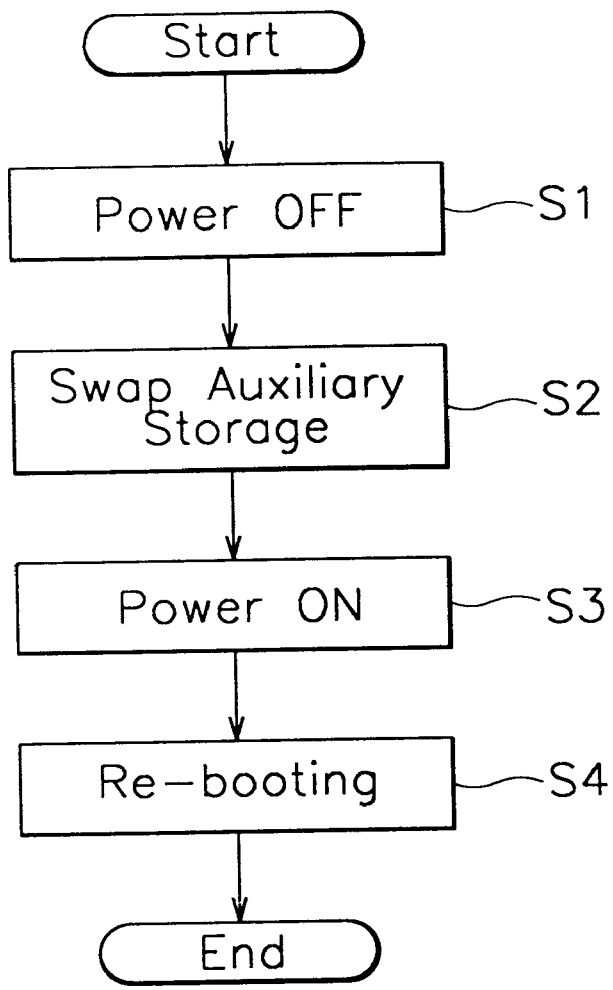
FIG. 1 is a flowchart of an earlier method of swapping auxiliary storage devices.

FIG. 1 is a flowchart of the earlier method of swapping auxiliary storage devices as discussed in the Description of the Related Art above.

The power of the computer is first turned off in step S1 and in step S2, swapping of the auxiliary storage devices is effected. Power is then turned on in step S3 and the computer rebooted in step S4.

Figure 2:
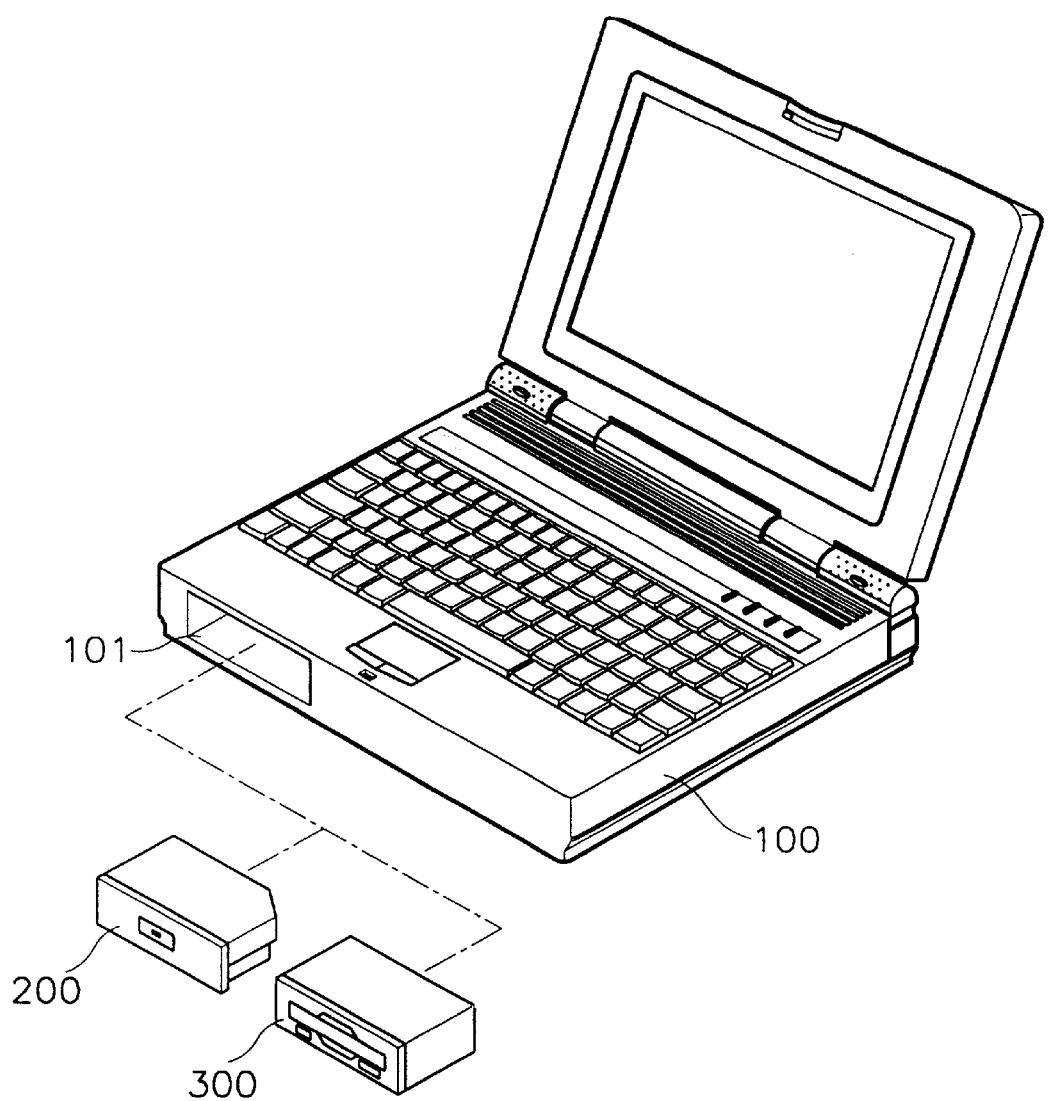
FIG. 2 is a perspective view of a laptop computer to which is applied a method of swapping auxiliary storage devices according to a first preferred embodiment of the present invention.

Referring first to FIG. 2, shown is a perspective view of a laptop computer to which is applied a method of swapping auxiliary storage devices according to a first preferred embodiment of the present invention. As shown in the drawing, a laptop computer 100 comprises a bay 101 into which one of two auxiliary storage devices 200 and 300 is inserted. Reference numeral 200 refers to a CDD and reference numeral 300 refers to a FDD.

Figure 3:
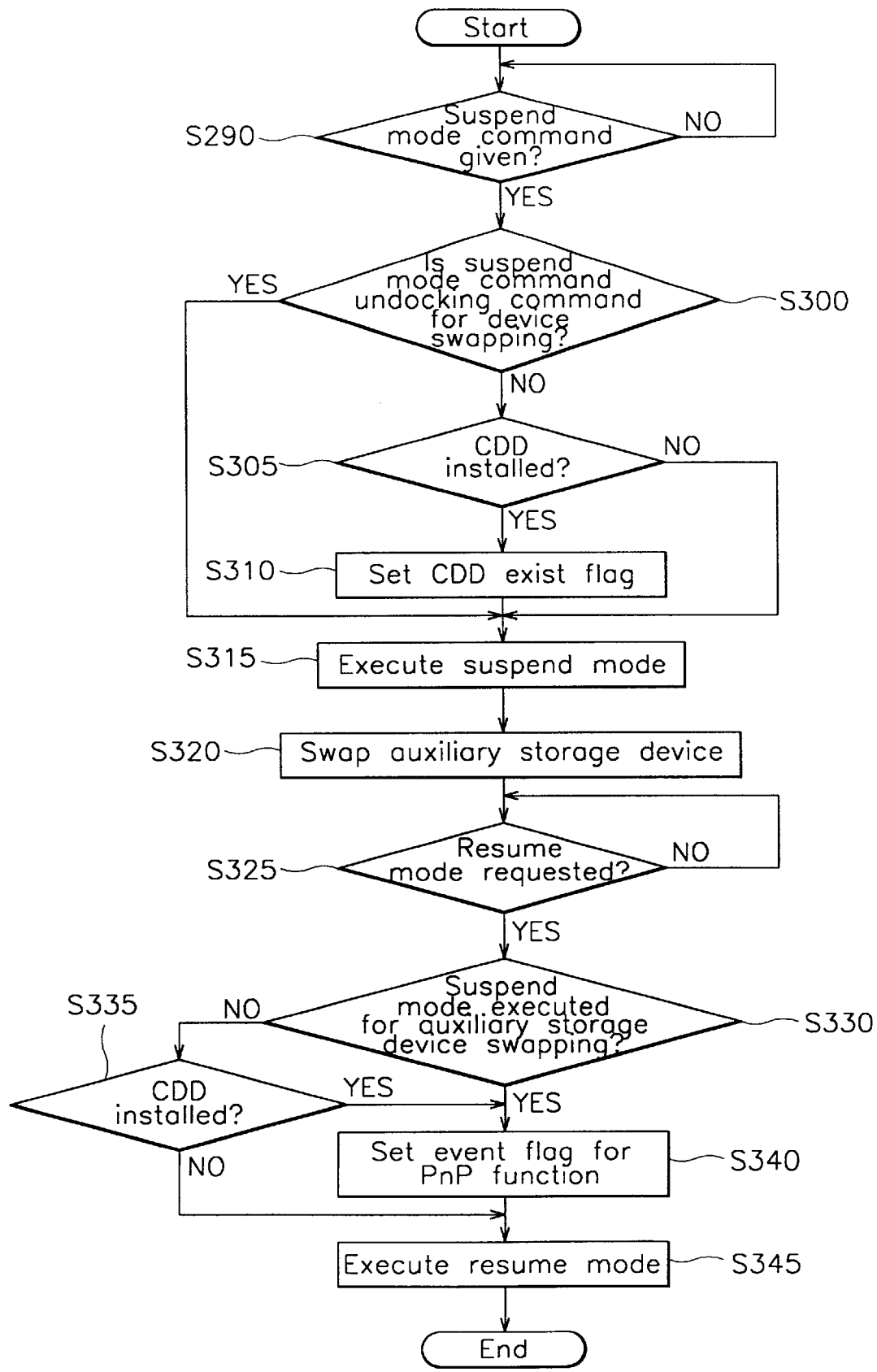
FIG. 3 is a flowchart of a method of swapping auxiliary storage devices using a suspend mode according to a first preferred embodiment of the present invention.

FIG. 3 is a flowchart of a method of swapping auxiliary storage devices using a suspend mode according to the first preferred embodiment of the present invention. In step S290, an operating system supporting plug-and-play capabilities (hereinafter referred to as a PnP OS-Windows 95) determines if a suspend mode command has been given. If such a command has been given in step S290, the PnP OS determines, in step S300, if the suspend mode command is an undocking command for swapping the auxiliary storage devices 200 and 300. Here, for example, the user may click on an "undock" item in the start menu of Windows 95. If it has been determined that the suspend mode command is not for undocking, the PnP OS prepares for a change in the hardware of the computer, and calls a PnP BIOS using a PnP function.

Next, in step S305, if the suspend mode command is not for undocking, the called PnP BIOS determines if the auxiliary storage device in the bay 101 of the laptop 100 is the CDD 200. Here, the bay 101 is a multi-use bay (i.e., various different auxiliary storage devices are compatible for use therein). If the auxiliary storage device in the bay 101 is the CDD 200, the PnP BIOS sets a CDD exist flag in step S3 10, and requests a suspend in the PnP OS. The PnP OS then executes a suspend mode using an APM (advanced power management) function in step S315.

When it has been determined in step S305 that the auxiliary storage device in the bay 101 is not the CDD 200 (and therefore the FDD 300), the PnP BIOS directly requests a suspend, and the PnP OS executes a suspend mode using the APM function in step S3 15. Further, in step S300, if it has been determined that the suspend mode command is an undocking command for swapping the auxiliary storage devices 200 and 300, steps 305 and 310 are skipped and the suspend mode is executed in step S315.

In step S320, after the suspend mode has been executed in step S315, the user swaps the CDD 200 with the FDD 300 or vice versa. Next, the PnP OS determines if a resume mode has been requested from the PnP BIOS in step S325. If a request for the execution of the resume mode has been made, it is determined if the suspend mode has been executed for the swapping of the auxiliary storage devices 200 and 300 in step S330. After this step, if it has been determined that the suspend mode was executed for the swapping of the auxiliary storage devices 200 and 300, the PnP BIOS sets an event flag for the PnP function in step S340, then the PnP OS executes the resume mode in step S345.

However, if it has been determined in step S330 that the suspend mode was not executed for the swapping of the auxiliary storage devices 200 and 300, the PnP BIOS determines if the auxiliary storage device in the bay 101 of the laptop 100 is the CDD 200 in step S335. If it has been determined that the CDD 200 is in the bay 101, the PnP BIOS sets an event flag for the PnP function in step S340, and then the PnP OS executes the resume mode in step S345, while if it has been determined that the CDD 200 is not in the bay 101 of the laptop 100, the resume mode is executed by the PnP OS in step S345.

In step S335, it can be determined whether the CDD 200 is in the bay 101 of the laptop 100 by checking if a value of the CDD 200 stored in a CMOS.

RAM is the same as a value set in a CDD exist flag before the swapping of the auxiliary storage devices 200 and 300.

In the above method of swapping auxiliary storage devices using a suspend mode according to the first preferred embodiment of the present invention, the auxiliary storage devices 200 and 300 can be swapped in the bay 101 of the laptop computer 100 without turning the computer exiting all programs.

Figure 4:
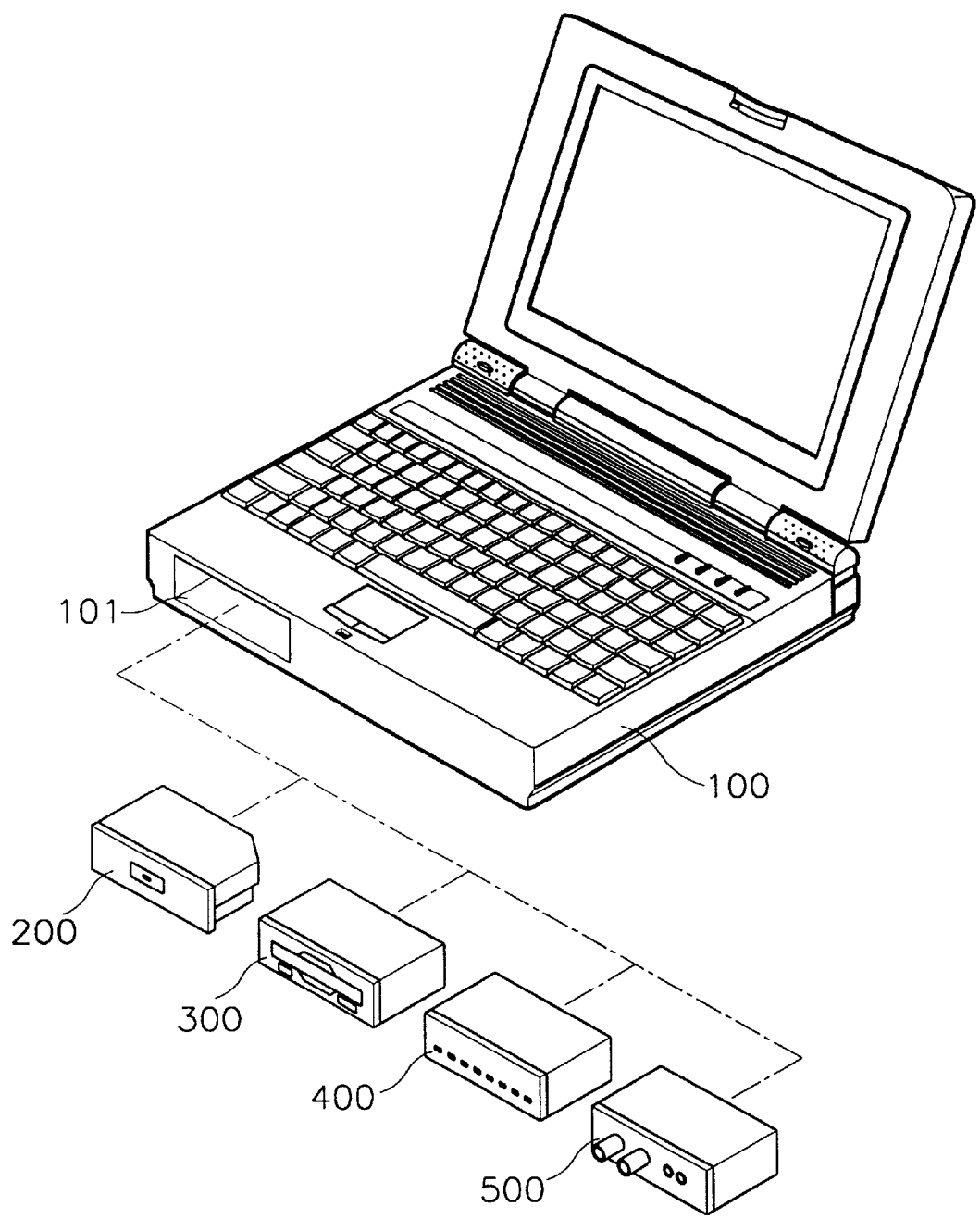
FIG. 4 is a perspective view of a laptop computer to which is applied a method of swapping auxiliary storage devices according to a second preferred embodiment of the present invention.

FIG. 4 is a perspective view of a laptop computer to which is applied a method of swapping auxiliary storage devices according to a second preferred embodiment of the present invention. As shown in the drawing, a laptop computer 100 to which the method according to the second preferred embodiment of the present invention comprises a bay 101 into which one of four auxiliary storage devices 200, 300, 400 and 500 is demountably inserted. In the second embodiment, the auxiliary storage devices 200, 300, 400 and 500 are respectively a CDD, a FDD, a HDD and a miscellaneous device.

Figure 5:
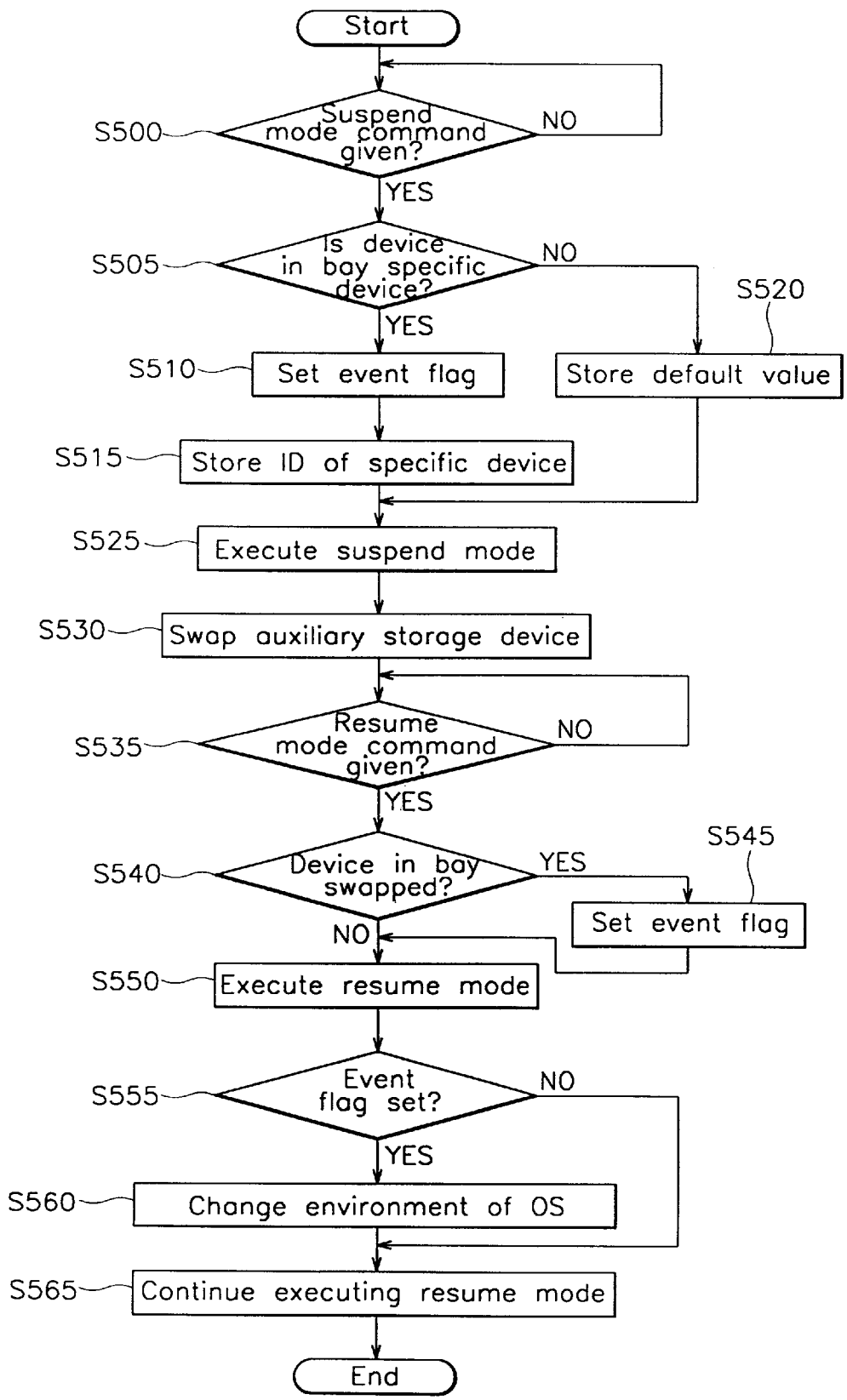
FIG. 5 is a flowchart of a method of swapping auxiliary storage devices using a suspend mode according to a second preferred embodiment of the present invention.

FIG. 5 is a flowchart of a method of swapping auxiliary storage devices using a suspend mode according to a second preferred embodiment of the present invention. First in step S500, it is determined if a suspend mode has been requested, and, if so, a PnP OS requests a PnP BIOS. That is, the user of the laptop computer 100 gives an undock command (provided, for example, in the start menu of Windows 95) for the swapping of the auxiliary storage devices 200, 300, 400 and 500 (e.g., the FDD 300 with the CDD 200 or vice versa, the HDD with the CDD or vice versa, etc.), to request a suspend mode in step S500. If a suspend mode has been requested, the PnP OS prepares for a change in the hardware of the computer, and requests a PnP BIOS using a PnP function.

Next, in step S505, the requested PnP BIOS determines if the device mounted in the bay 101 is a "specific device". Here, the specific device refers to the CDD 200, the HDD 400 or the miscellaneous device 500, and not the FDD 300, The bay 101 of the laptop computer 100 is a multi-use bay (i.e., a variety of different devices are compatible for use therein).

If it has been determined in step S505 that the device installed in the bay 101 is a specific device, an event flag is set in step S510, and an ID of the specific device is stored in step S615. Next, in step S525, a suspend mode is executed. However, if it has been determined in step S505 that the device installed in the bay 101 is not a specific device (i.e., the FDD 300), the PnP BIOS stores a default value in step S520, after which the PnP OS executes a suspend mode in step S525. Following the execution of the suspend mode, the user swaps two of the auxiliary storage devices 200, 300, 400 and 500.

After swapping two of the auxiliary storage devices 200, 300, 400 and 500 in step S530, the PnP OS determines if a resume mode has been requested from the PnP BIOS in step S535, the resume mode being activated by the user. If the activation of the resume mode has been detected in step S535, the PnP BIOS determines if the device in the bay 101 has been swapped in step S540. If so, an event flag for a PnP function is set in step S545, and the PnP OS executes the resume mode in step S550. However, in step S540, if it has been determined that the device in the bay 101 has not been swapped, step S550 (execution of the resume mode by the PnP OS) is directly performed.

In step S540 above, a determination is made as to whether or not the device in the bay 101 has been swapped by comparing the ID of the device (one of the CDD 200, FDD 300, HDD 400, miscellaneous device 500 or none) before the suspend mode is executed in step S525 and after the resume mode is requested in step S535. Here, "none" refers to no device being installed in the bay 101 of the laptop computer 100.

After the execution of the resume mode in step S550, the PnP OS determines if the event flag has been set by performing polling in step S555. If so, an environment of the OS is changed to correspond to the ID of the device (200, 300, 400, 500 or none) in step S560, after which the resume mode is continuously executed in step S565.

In the above method of swapping auxiliary storage devices using a suspend mode according to the second preferred embodiment of the present invention, the auxiliary storage devices 200, 300 and 400 and the miscellaneous device 500 can be swapped in the bay 101 of the laptop computer 100 without turning the computer off using the suspend mode, and the computer can be used again in the state before the suspend mode was executed by activating the resume mode.

Before implementing the method of swapping auxiliary storage devices using a suspend mode according to the first and second preferred embodiments of the present invention, the computer is booted using an OS such as Windows 95 and an ID of each of the hardware devices to be swapped must be input into the OS. Further, the PnP BIOS obtains information on the state of each of the hardware devices using the "Lapkat" keyboard controller.

In the methods of the first and second preferred embodiments of the present invention, a warm swap of auxiliary storage devices can be performed using a suspend mode and a resume mode. Accordingly, the computer need not be turned off for the swapping of auxiliary storage devices, nor do the programs in use need to be exited, thereby increasing convenience to the user and reducing the amount of time used to swap auxiliary storage devices.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A method of swapping auxiliary storage devices in a computer using a suspend mode comprising the steps of:

determining if a suspend mode command was given, and, if so, determining if a specific device is mounted in a bay of the computer and setting an event flag if a specific device is mounted in the bay of the computer, and after storing an ID of the specific device, executing the suspend mode, or storing a default value if a specific device is not mounted in the bay of the computer and executing the suspend mode.

2. The method of claim 1, the suspend mode enabling the swapping of auxiliary storage devices in the bay of the computer while maintaining the computer in an ON state and temporarily suspending all programs in use.

3. The method of claim 2 further comprising the steps of, determining if a resume mode command has been given, and, if so, determining if the device in the bay of the computer has been swapped;

setting an event flag for a plug-and-play function if the device in the computer has been swapped, and executing the resume mode, or directly executing the resume mode if the device in the computer has not been swapped; and determining if the event flag has been set, and, if so, changing an environment of an operating system and continuing the resume mode, or if the event Rag has not been set, directly continuing the resume mode.

* * * * *